US012684640B2

(12) United States Patent (10) Patent No.: US 12,684,640 B2
Palakonda et al. (45) Date of Patent: Jul. 14, 2026

(54) SYSTEM AND METHOD TO LOCATE AND TRACK PORTABLE DEVICES ABOUT A VEHICLE USING WIRELESS COMMUNICATION TECHNIQUES

(71) Applicant: Ford Global Technologies, LLC, Dearborn, MI (US)

(72) Inventors: Sathyanarayana Chary Palakonda, Northville, MI (US); Ivan Vukovic, Birmingham, MI (US); Jeffrey Wallat, Bloomfield Hills, MI (US); Jean de Dieu Mutangana, Detroit, MI (US); Lisa Gentile, Ave Maria, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 18/419,003

(22) Filed: Jan. 22, 2024

(65) Prior Publication Data

US 2025/0240841 A1 Jul. 24, 2025

(51) Int. Cl.
*H04W 76/15* (2018.01)
*H04L 67/12* (2022.01)
*H04W 76/14* (2018.01)

(52) U.S. Cl.
CPC ............. *H04W 76/15* (2018.02); *H04L 67/12* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 7,405,658 B2 | 7/2008 | Richards | |
| 7,602,339 B2 | 10/2009 | Fullerton et al. | |
| 2019/0340876 A1 | 11/2019 | Northrup et al. | |
| 2021/0072373 A1* | 3/2021 | Schoenberg | .......... G01S 13/878 |
| 2021/0356279 A1 | 11/2021 | Szigeti | |
| 2022/0165146 A1 | 5/2022 | Daoura et al. | |

(Continued)

FOREIGN PATENT DOCUMENTS

| | | |
|---|---|---|
| CN | 112270388 A | 1/2021 |
| CN | 115988409 A | 4/2023 |

*Primary Examiner* — Christopher T Wyllie
(74) *Attorney, Agent, or Firm* — Joseph Zane; Brooks Kushman, P.C.

(57) ABSTRACT

A vehicle system includes a first communication device, a plurality of second communication devices, and a controller. The first communication device is configured to communicate using a first wireless communication method. The plurality of second communication devices are configured to communicate using a second wireless communication method and are disposed at two or more known locations along a vehicle. The controller is configured to define a communication schedule identifying a designated communication session for a portable device (PD) to communicate via the second wireless communication method, provide, via the first communication device to the PD, data indicative of a designated communication session of the communication schedule for the PD to communicate via the second wireless communication method, and store a location of the PD in response to detecting the location of the PD based on a message provided by the plurality of second communication devices at the designated communication session.

20 Claims, 4 Drawing Sheets

(56) References Cited

U.S. PATENT DOCUMENTS

| | | |
|---|---|---|
| 2022/0404448 A1 | 12/2022 | Koo et al. |
| 2023/0019120 A1 | 1/2023 | Koo et al. |
| 2023/0051718 A1 | 2/2023 | Ledvina et al. |
| 2023/0062363 A1 | 3/2023 | Golshan et al. |
| 2023/0117010 A1 | 4/2023 | Kang et al. |
| 2023/0188384 A1 | 6/2023 | Claffey et al. |
| 2023/0234538 A1 | 7/2023 | Golsch et al. |

* cited by examiner

SYSTEM AND METHOD TO LOCATE AND TRACK PORTABLE DEVICES ABOUT A VEHICLE USING WIRELESS COMMUNICATION TECHNIQUES

TECHNICAL FIELD

The present disclosure is generally directed to detecting and tracking a portable device in and/or about a vehicle.

BACKGROUND

The statements in this section merely provide background information related to the present disclosure and may not constitute prior art.

A vehicle system can generally identify and communicate with a portable device using a wireless communication technique/method, such as but not limited to short range communication (e.g., BLUETOOTH-type and/or ultra-wide band communication). Along with communication, short range communication can also be used to detect a location of a portable device.

SUMMARY

This section provides a general summary of the disclosure and is not a comprehensive disclosure of its full scope or all of its features.

In one form, the present disclosure is directed to a vehicle system that includes a first communication device, a plurality of second communication devices, and a controller. The first communication device is configured to communicate using a first wireless communication method. The plurality of second communication devices are configured to communicate using a second wireless communication method and are disposed at two or more known locations along a vehicle. The controller is configured to: define a communication schedule identifying a designated communication session for a portable device to communicate via the second wireless communication method, provide, via the first communication device to the portable device, data indicative of a designated communication session of the communication schedule for the portable device to communicate via the second wireless communication method, and store a location of the portable device in response to detecting the location of the portable device based on a message provided by the plurality of second communication devices at the designated communication session.

In one form, the present disclosure is directed to a method for locating a portable device by a vehicle having a first communication device configured to communicate using a first wireless communication method and a plurality of second communication devices configured to communicate using a second wireless communication method. The method includes defining a communication schedule identifying a designated communication session for the portable device to communicate via the second wireless communication method; providing, via the first communication device to the portable device, data indicative of a designated communication session of the communication schedule for the portable device to communicate via the second wireless communication method; and storing a location of the portable device in response to detecting the location of the portable device based on a message provided by the plurality of second communication devices at the designated communication session.

In one form, the present disclosure is directed to a vehicle system that includes a first communication device, a plurality of second communication devices, and a controller. The first communication device is configured to communicate using a first wireless communication method. The plurality of second communication devices are configured to communicate using a second wireless communication method and disposed at two or more known locations along a vehicle. The controller is configured to: define a communication schedule identifying a plurality of designated communication sessions for a plurality of portable devices, where each designated communication session indicates when a respective portable device is to communicate via the second wireless communication method; provide, via the first communication device to the portable device, data indicative of the designated communication session to each portable device; transmit, via the plurality of second communication devices, messages at each designated communication session; and store a location of the plurality of portable devices in response to detecting the location of the portable device based on the messages provided by the plurality of second communication devices at the plurality of designated communication sessions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Locating portable devices inside and/or about a vehicle can be difficult using current methods. The present disclosure provides a vehicle system configured to detect, locate, and track portable devices within a detection region of a vehicle using different wireless communication methods/ technique. More particularly, the vehicle system defines a communication schedule that identifies a dedicated communication session for each portable device. During the communication session, selected wireless devices at the vehicle broadcast messages that is to be received and responded to by one of the portable devices, as identified in the communication schedule (i.e., based on a designated communication session or, stated differently, a session ID). Using one or more signal analysis, the location of the portable device may be determined, saved, and provided to a user.

Figure 1A:
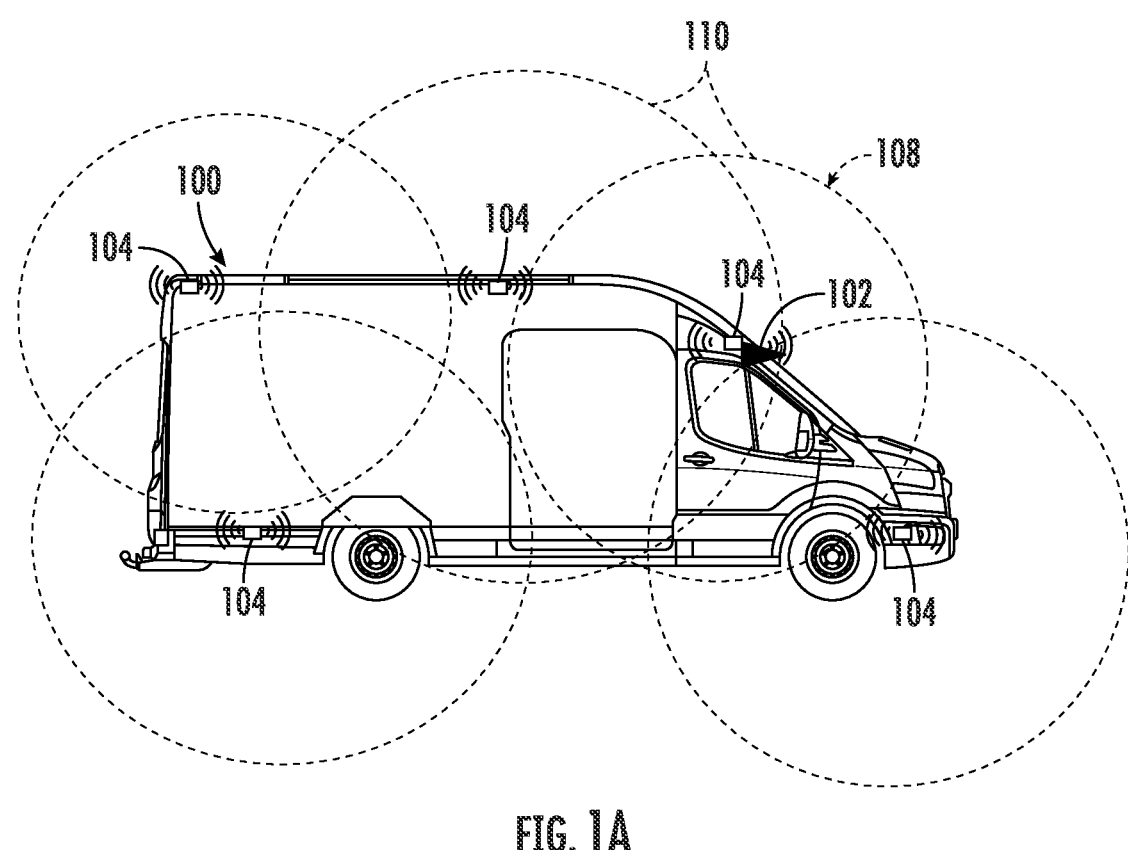
FIG. 1A is a side view of a vehicle having multiple communication devices in accordance with the present disclosure.
Figure 1B:
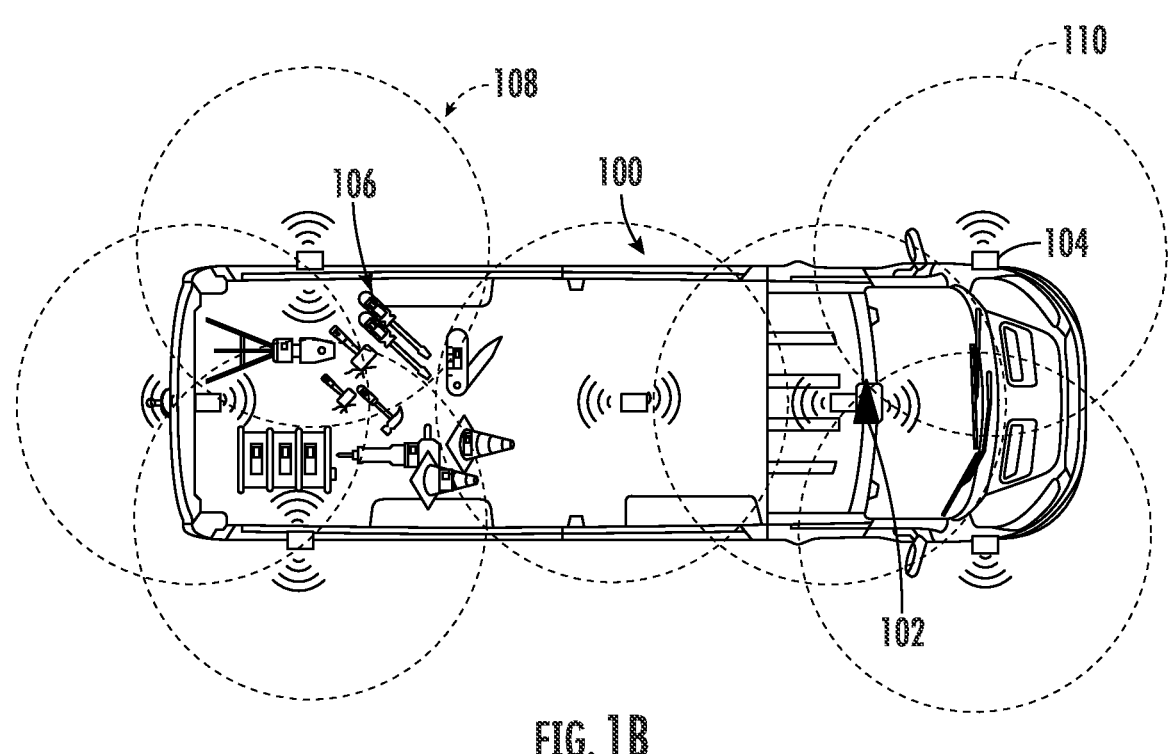
FIG. 1B is a top view of the vehicle of FIG. 1B illustrating portable devices within the vehicle in accordance with the present disclosure.
Figure 2:
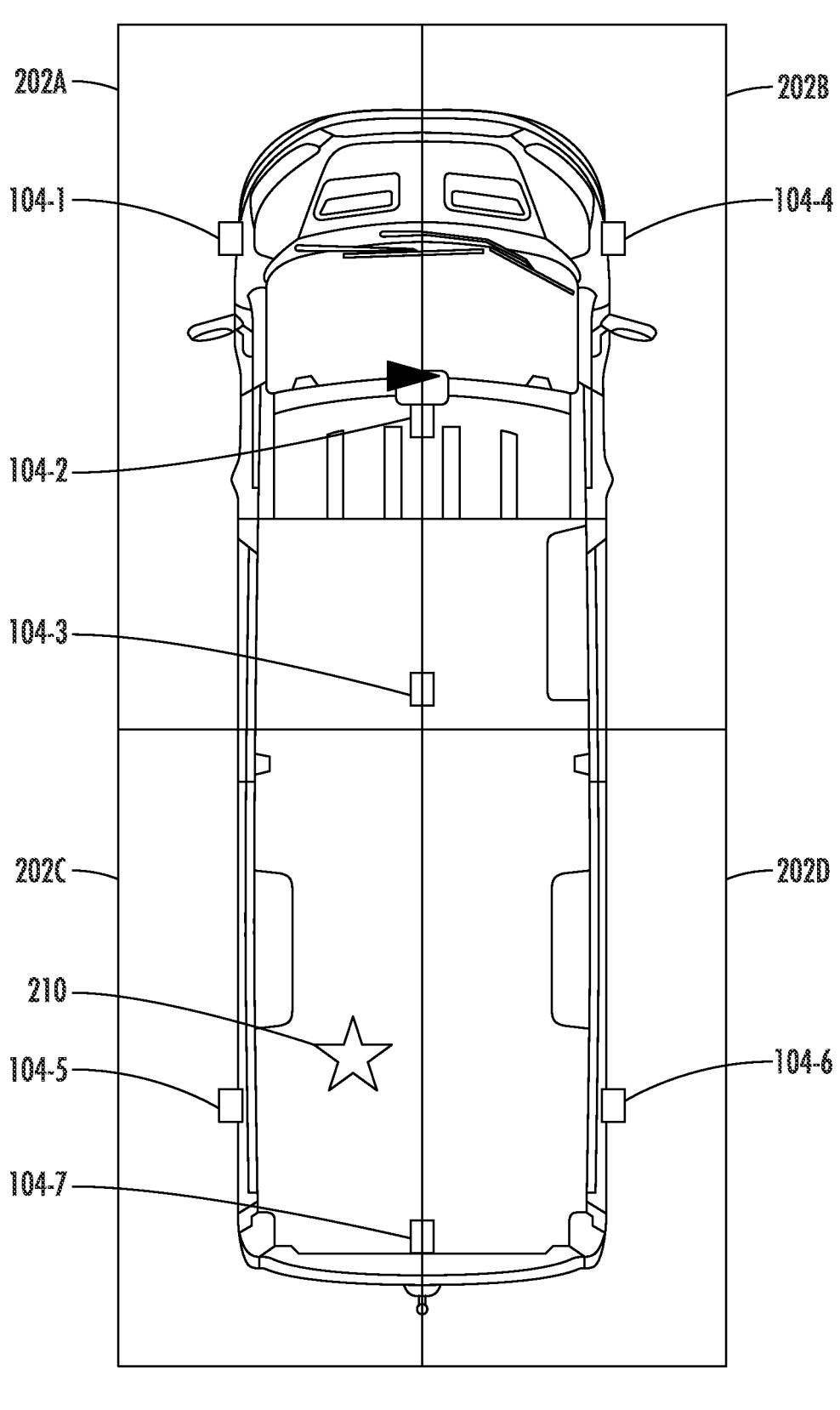
FIG. 2 is a top view of the vehicle illustrating communication regions of the vehicle in accordance with the present disclosure.

Referring to FIGS. 1A, 1B, and 2 a vehicle 100 includes different type of communication devices 102, 104 configured to communicate with portable devices 106 using different wireless communication methods/protocols. In a non-limiting example, the vehicle 100 includes a BLUETOOTH (BT) type communication device, as a first communication device (FCD) 102, and a plurality of ultra-wideband (UWB) devices, as second communication devices (SCD) 104. The BT-type communication device is configured to communicate using, as a first communication method, BT protocol (e.g., BT low energy protocol and/or BT classic protocol) and the UWB devices are configured to communicate using, as a second communication method, UWB protocol. In the figures, the first communication device 102 is illustrated as a triangle and the SCD 104 is illustrated as a rectangle to distinguish between the devices 102, 104.

The portable devices 106 are configured to communicate with the vehicle 100 via the communication methods (e.g., the BT protocol and UWB protocol), and are generally movable to and from the vehicle 100. In a non-limiting example, the portable devices 106 may include, but are not limited to, tools (e.g., screwdriver, drills, jack hammer), storage bin/containers, smart phones, tablets, and/or sensors, caution cones. As described herein, with the portable devices 106 being moved in and out of the vehicle 100, the location of the portable devices 106 is detected and saved to inform the user if the portable device 106 is at or near the vehicle 100, is not at the vehicle 100, and/or the last known location of the portable device 106.

More particularly, the communication devices 102, 104 of the vehicle 100 define a detection region 108 within which the portable devices 106 are able to communicate with the vehicle 100. The detection region 108 is generally defined by the communication zones 110 of the first and second communication methods. In FIGS. 1A and 1B, the dashed line circles represent the communication zones 110 and the detection region 108 includes areas captured by all of the communication zones 110. In one form, the first communication method has a broader communication range than the second communication method and, as detailed herein, the first communication method is employed to provide messages/command to the portable devices 106 and the second communication method is employed to detect a location of the portable devices 106.

Referring to FIG. 2, the detection region 108 may be further defined into multiple sections 202A, 202B, 202C, 202D (collectively "sections 202") to correlate portions of the detection region 108 with the vehicle 100, where each section 202 is associated with at least one SCD 104. In a non-limiting example, the SCD 104-1, 104-2, 104-3 are associated with section 202A, the SCD 104-1, 104-3, and 104-4 are associated with section 202B, the SCD 104-5, 104-7 are associated with section 202C, and SCD 104-6 and 104-7 are associated with section 202D. It should be readily understood that while the sections are illustrated in the two-dimensional plane (e.g., width and depth), the sections 202 also include the third dimensional plan (e.g., vertical/ height). In addition, the number, size, and/or shape of the sections 202 may be different from what is being illustrated and each section may be different from each other.

Figure 3:
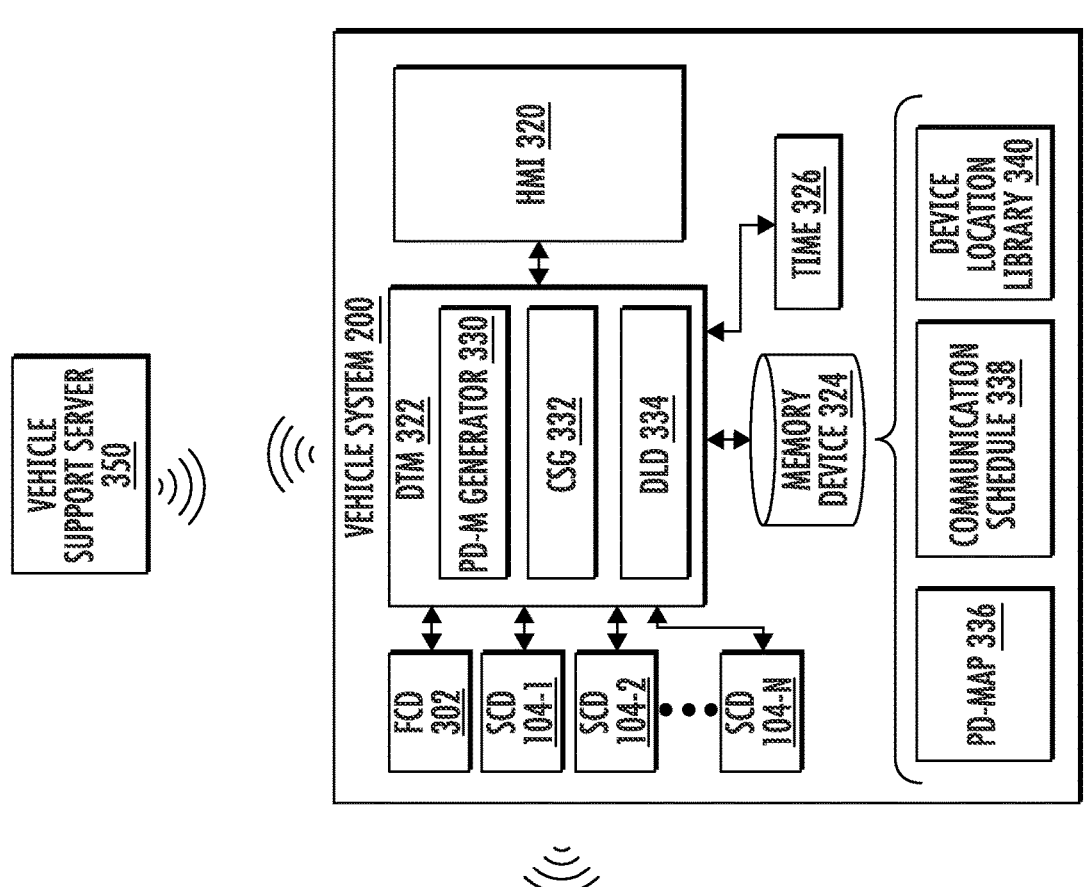
FIG. 3 is a block diagram of the vehicle and a portable device in accordance with the present disclosure.
Figure 3:
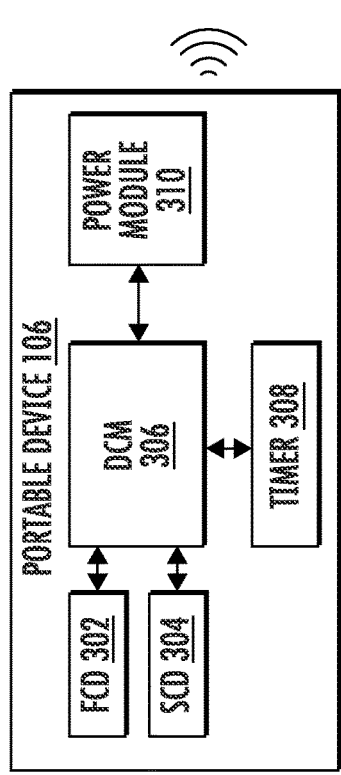

Referring to FIG. 3, in one form, the portable device 106 includes a FCD 302, a SCD 304, a device communication module (DCM) 306, a timer 308, and a power module 310 for providing power to electric components of the portable device 106. The FCD 302 and the SCD 304 may be referred to as portable device FCD (PD-FCD) 302 and portable device SCD 304 (PD-SCD) 304 so as not to be confused with the FCD 102 and SCD 104 of the vehicle 100. The PD-FCD 302 and PD-SCD 304 are similar to the FCD 102 and SCD 104 of the vehicle 100 to enable communication via the first and second wireless communication methods.

The DCM 306 is configured to communicate with other devices/systems, such as the vehicle 100, using the PD-FCD 302 and PD-SCD 304. In one form the DCM 306 is configured to follow protocols associated with the first and second communication methods to process and respond to messages received. More particularly, the DCM 306 is configured to detect FCD 102 and SCD 104, and pair with the FCD 102 to automatically establish communication with the FCD 102 when in the detection region 108.

As detailed herein, the DCM 306 is further configured to detect and respond to messages transmitted via the second communication method in accordance with a designated communication session assigned to the portable device 106 by the vehicle 100. That is, in lieu of scanning for signals transmitted via the second communication method every 100 ms, for example, the designated communication session identifies a time period at which the vehicle 100 intends to communicate with the portable device 106, and thus, thus the portable device 106 is able to turn on at that session. In a non-limiting example, the DCM 306 sets the timer 308 based on the designated communication session and transitions to a sleep mode. Once the designated communication session is reached, as detected by the timer 308, the DCM 306 turns-on and scans for a message using the PD-SCD 304. If received, the DCM 306 responds to the message and then transitions back to the sleep mode once the designated communication session is over until the next designated communication session.

During the designated communication session or at other suitable communication times when the DCM 306 is activated, the DCM 306 may respond to other messages detected by the PD-FCD 302. For example, the DCM 306 is configured to provide information related to a power status/ state of the portable device 106 based on inputs from the power module 310, which estimates power level of a power source (not shown) of the portable device 106.

Among other components, a vehicle system 200 of the vehicle 100 includes one or more human-machine interfaces (HMI) 320, a device tracking module (DTM) 322, a memory device 324, and a timer 326. In one form, the HMI 320 are devices that exchange information with a user (i.e., configured to receive and/or output information). In a non-limiting example, HMI includes audio devices (e.g., microphone and/or speaker), display device (e.g., a head-up display and/or a liquid crystal display with touchscreen), and/or other suitable interfaces (e.g., buttons, knobs, etc.).

The DTM 322 is configured to define a communication schedule 338 and detect a location of the portable device(s) 106 within the detection region 108 based on the communication schedule 338. In one form, the DTM 322 includes a portable device mapping (PD-M) generator 330, a communication schedule generator (CSG) 332, and a device location detector (DLD) 334.

The PD-M generator 330 is configured to define a portable device (PD) map 336 that correlates the portable device 106 paired to communicate with the FCD 102 with a media access control (MAC) address. Specifically, when the portable device 106 is first brought within the communication zone of the FCD 102, the portable device 106 and the FCD 102 are assigned a MAC address to pair the FCD 102 and the portable device 106 using known techniques associated with the first wireless communication method. The PD-M generator 330 stores a unique identification associated with and received from each portable device 106 with the MAC address in the PD map 336, where the PD map 336 identifies unique IDs for each portable device 106 paired with the FCD 102 and the unique ID is used in managing communication sessions with the portable devices 106. In some variations, to conserve power of the portable device 106, the portable device 106 and the FCD 102 may be paired using low energy techniques such as, but not limited to generic attribute profile (GATT) protocol. The PD map 336 is stored in the memory 324 and may be updated to add and/or remove paired portable devices 106.

The CSG 332 is configured to define a communication schedule 338 for the portable devices 106 provided in the PD-map. The communication schedule 338 provides or, more specifically, defines a designated communication session (DCS) for each portable device 106 to communicate with the vehicle 100 via the SCDs 104 using the second wireless communication method. In a non-limiting example, when the vehicle 100 is turned ON, the CSG 332 assigns the designated communication session for each portable device 106 paired with the FCD 102, where each designated communication session is a set duration, such as 100 ms. In one form, the total duration for detecting the portable devices 106 is substantially equal to the set duration multiplied by the number of portable devices 106 provided in the PD-map 3360. That is, the communication schedule 338 is defined such that portable devices 106 are communicating using round-robin style communication or time-division multiplexing (TDM), so each device communicates at the designated communication session. In a non-limiting example, if five portable devices 106 are to be tracked, the total duration for detecting the devices 106 is 500 ms. The total duration is divided into five 100 ms sessions, and each portable device 106 is assigned a session. In one form, the communication schedule 358 includes the information in the PD-map 336 and also provides the designated communication session for each portable device 106. In a non-limiting example, the designated communication session may be associated with a session identification that indicates which session from among the five sessions the portable device 106 is to be ON (e.g., the identification can be indicative of a time tracked by the timer 308 of the portable device 106). An example of a communication schedule is provided in table 1 below. Once defined, the communication schedule 338 is saved in the memory device 324. In addition, the CSG 332 is configured to provide data indicative of respective designated communication session via the FCD 102 to each portable device 106.

TABLE 1

| Example Communication Schedule | | |
|---|---|---|
| BT Map Address | Device Name | DCS |
| 00:11:22:33:FF:EE | Tool 1 | 0x1115 |
| 00:11:22:33:FE:AE | Hammer 1 | 0x1116 |
| 00:11:22:33:FD:BE | Hammer 2 | 0x1117 |

It should be readily understood that the duration of each designated communication session may be set to another value and should not be limited to 100 ms. In addition, while the total duration is provided to be variable based on the number of portable devices, the total duration may be set to a value that is less than or equal to set a threshold to prevent delays in tracking location.

In some variations, more than one portable device 106 may be part of the same designated communication session to communicate with the vehicle 100 at the same time at the assigned time (i.e., at the designated communication sessions). Accordingly, the portable devices 106 may be grouped together and detectable by the second communication devices 104.

As it was mentioned above, the portable device 106 may use a sleep mode to conserve power of the portable device 106. Another power conservation approach for the portable device 106 may include conserving power when transmitting a message via PD-SCD 304. For example, if the portable device 106 is located inside the vehicle 100, it does not need maximum power to communicate with a SCD 104. This power control may not affect locating the portable device 106 because the method to estimate the distance is based on time-of-flight rather than receive-signal-strength. In one form, the portable device 104 may lower its power based on the signal strength of a message received from the FCD 102 or SCD 104. This method is based on the reciprocity of the channel by inferring that if the portable device 106 is receiving at a high signal level then the vehicle 100 would also receive at an unnecessarily high signal level, and therefore, the portable device 106 may reduce its power level. In another form, using a signal level strength from a previous communication round, the DCM 306 identifies a power level in an updated communication schedule that the portable device 106 may use to communicate with the SCD 104, and requests the portable device 106 to reduce its power by sending a message via the FCD 102.

In some variations, the CSG 332 is configured to assign the designated communication session to portable devices 106 intended to be tracked by the vehicle 100. More particularly, when the portable device 106 is being paired to the FCD 102, the PD-M generator 330 is configured to provide a notification via one or more HMIs inquiring whether the portable device 106 is to be tracked. A user, such as a passenger of the vehicle 100, may input their selection using one or HMI (e.g., pressing an icon on the display device and/or provide a verbal response detected by a microphone). The PD-map 336 may include data indicating whether each paired portable device 106 is to be tracked, and the CSG 332 assigns the designated communication session only to the portable device 106 to be tracked.

The DLD 334 is configured to detect the location of the portable device 106 using messages exchanged between the SCD 104 and a respective portable device 106 in accordance with the communication schedule 338. More specifically, using each SCD 104, the DLD 334 broadcasts a location message at each of the designated communication sessions of the communication schedule 338 in a manner similar to time division multiplexing. If the portable device 106 that is intended to be ON during the session is within the detection region 108, the respective portable device 106 transmits a response message that is detected by one or more of the SCDs 104 that is within the communication zone 110 of the portable device 106. In a non-limiting example, the DLD 334 employs known time of flight (TOF) analysis to calculate a location of the portable device 106 using trilateration method and data related to the location message and the response message. In some variations, the DLD 334 may also use angle of arrival (AOA) analysis of the response message to further determine a direction of portable device 106 with respect to the SCD 104, where the direction may indicate whether the portable device 106 is in the vehicle 100, in a building near the vehicle 100, and/or outside of the vehicle 100. In some instances, the portable device 106 may receive multiple messages from multiple SCD 104, and transmits a response message to each SCD 104, which may be used to determine the location of the portable device 106.

Stated differently, the DLD 334 determines/calculates a distance of the portable device 106 from a respective SCD 104 using known TOF/AOA techniques based on the location and response messages exchanged between each SCD 104 and the portable device 106. Using the location of the SCD 104 and the distance of the portable device 106, the DLD 334 is able to determine a location of the portable device 106 with respect to the vehicle 100. With the location of each SCD 104 on the vehicle 100 being known, multiple communication zones 110 in and around the vehicle 100 are defined to identify a location of the portable device 106 and more particularly, employed to indicate whether the portable device 106 is, for example, inside, outside, above and/or underneath the vehicle. In a non-limiting example, the location may be provided as coordinates (e.g., x, y, z).

Prior to sending the location message, the DLD 334 is configured to synchronize timers of the portable devices 106 with each other. In a non-limiting example, using the FCD 102, the DLD 334 transmits a timer interval command that identifies a time that the timer 308 is to be set at, where the time is the total duration for detecting the portable devices 106. The DLD 334 further initializes the timer 326 to the session duration of each communication session (e.g., 100 ms), such that the timer 326 triggers (resets) after every session duration as the DLD 334 moves down the communication schedule 338 contacting the portable devices 106.

In one form, once determined, the DLD 334 is configured to provide a notification via one or more HMI 320. For example, the DLD 334 displays a device location interface, which is a graphical interface of the vehicle 100 similar to that provided in FIG. 2, with a location icon 210 indicating a detected position of the portable device 106. As part of the device location interface, the DLD 334 may also provide contextual information regarding the portable device 106 including, but not limited to, identification information associated with the portable device 106 and a detection time indicating a time that the portable device 106 was detected. In one form, the DLD 334 is configured to indicate all of the portable devices 106 location on the device location interface, and if an icon is selected by the user, contextual information may be provided in a pop-up menu.

The DLD 334 may provide the notification in various suitable ways and should not be limited to the example provided herein. For example, different views of the vehicle 100 may be provided using the display device with the different views illustrating one or more locations icons if applicable; a table may be provided listing the portable devices 106 and indicating whether the portable device 106 was located; and/or the image/table may not be provided automatically, but when requested by the user through one or more graphical interfaces associated with the DTM 322.

The DLD 334 is also configured to store the location of the portable device 106 with the unique identification associated with the portable device 106 in a device location library 340 of the memory device 324. In a non-limiting example, the device location library 340 may store historical locations for a selected period of time; may store the currently detected location; or a last detect and currently detected locations. In some variations, the data of the device location library 340 may be stored in a vehicle support server 350 to free-up storage in the memory device 324. In one form, the vehicle support server 350 is a remote cloud-based server in communication with the vehicle 100 using, for example, vehicle-to-infrastructure (V2I) communication. In one form, the vehicle support server 350 may store a location history of the portable device 106 that may be accessible by the user.

In the event that a response message is not received from the portable device 106, the DLD 334 is configured to provide a notification using the HMI 320, where the notification provides that the portable device 106 is not detected. In some variations, the DLD 334 may also provide a last detected location of the portable device 106, which may be employed by the user to track the portable device 106.

In some variations, the DTM 322 may also be configured to notify the user when the portable device 106 is being left. For example, if the vehicle 100 is moving and the location of the portable device 106, which was once detected, is no longer detected or if the location is detected but is not moving as the vehicle 100 is moving, then the DTM 322 may determine that the portable device 106 is not in the vehicle 100 and may be left behind.

In some variations, the DTM 322 is further configured to obtain additional information from the portable devices 106 using the FCD 102. In a non-limiting example, the DTM 322 is configured to request a power status of the portable device 106 and if available, provide the information to the user via the HMI 320. Specifically, the DTM 322 is configured to transmit a power status request message via the FCD 102 to the portable device 106, which provides a power status response message indicating a power status of the portable device 106. In one form, the DTM 322 may provide the power status information with the location of the portable device 106.

Figure 4:
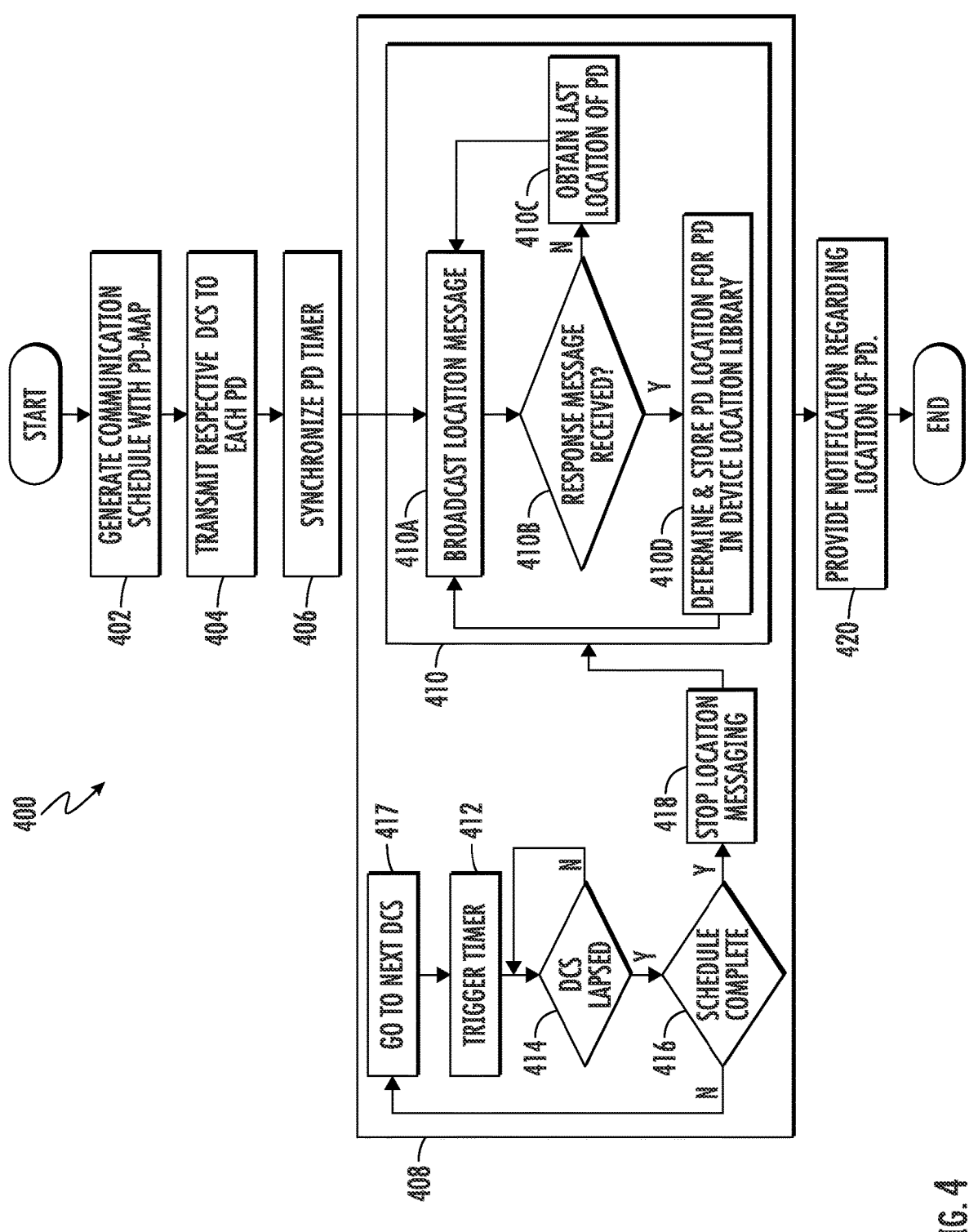
FIG. 4 is a flowchart illustrating a device location routine in accordance with the present disclosure.

Referring to FIG. 4, an example device tracking routine 400 is provided and performed by the vehicle system 200 of having the DTM 322 of the present disclosure. The routine 400 begins after the vehicle is turned on, and the PD-map 336 is provided in the memory device 324. Details regarding each of the operations is described in detail above, and are not restated here for purposes of brevity.

At operation 402, the communication schedule 338 is generated using the PD-Map 336, where the communication schedule 338 defines a dedicated communication session (DCS) for each portable device (PD) 106. Using the FCD 102, the vehicle system transmits a respective DCS to each PD 106, at operation 404, and synchronizes the timer 308 of each PD 106, at operation 406.

At operation 408, the vehicle system 200 begins to track the PD 106 by transmitting location messages, at operation 410. Specifically, at operation 412, the vehicle system 200 triggers the timer 326 for the communication session and at operation 410A, the vehicle system 200 has the SCD(s) 104 broadcast location messages. At operation 410B, the vehicle system 200 determines if a response message is received. If no response message is received, the vehicle system 200 obtains the last location of the PD 106 from, for example, the memory device 324 and/or server 350, at operation 410C, and returns to 410A. If a response message is received, the vehicle system 200 determines and stores the location of the PD 106 that provided the response message in the device location library 340, at operation 410D. More particularly, based on the communication schedule 338, only one PD 106 is ON to detect the location message from the SCD(s) 104. If no response message is received, the PD 106 that is supposed to be ON is identified as not being located and the last known location of the PD 106 is obtained. If the response message is received, the location of the PD 106 is determined using, for example, TOF/AOA, and is stored.

To detect each of the PDs 106 in accordance with the communication schedule 338, the vehicle system 200 determines if the current designated communication session has lapsed based on the timer 326, at operation 414. If the DCS has lapsed, the vehicle system 200 determines if all of the DCS of the communication schedule 338 have been completed, at operation 416. In a non-limiting example, the vehicle system 200 may have a counter to track the number of DCS completed and determine if the number of DCS completed coincides with the number of DCS in the communication schedule 338. Other suitable method may be used to determine if each DCS has been completed, for example, a second timer may be used to track the total duration for tracking all of the PD 106s.

If the current DCS has lapsed (i.e., operation 414: Yes), but the communication schedule is not complete (i.e., operation 416: No), the vehicle system 200 goes to the next designated communication session at operation 417 and triggers the timer 326 at operation 412 to go to the next designated communication session. Alternatively, if the communication schedule is complete (i.e., operation 416: Yes), the vehicle system 200 stops the location messaging routine of operation 410, and the vehicle system 200 proceeds to operation 420 to provide a notification regarding the location of the PD 106s.

In a non-limiting example, the routine 400 may be performed periodically when the vehicle is ON, when the vehicle is OFF and stationary, and/or when the user requests the portable devices 106 to be located.

The device tracking routine 400 may be configured in various suitable ways in accordance with the present disclosure and should not be limited to the example described herein. In a non-limiting example, in lieu of waiting until all DCS are performed, a notification may be provided after the PD 106 is located and/or not detected. In another example, the vehicle system 200 may transmit a power status check to the portable devices 106 via the FCD 102 either before or after operation 408, and the information from the PDs 106 may be provided with the notification at operation 420.

The vehicle system 200 having the DTM 322, the FCD 102, and the SCD 104 is configured to detect, locate, and track multiple portable devices 106 by employing a communication schedule assigning a designated communication session for each portable device. Each portable device 106 that the user would like to track may be located within, for example, centimeter level of accuracy, where each portable device 106 is associated with a unique identification to distinguish it from other devices 106. In addition to location, a health/power status of the portable device 106 is also available to the user.

In some variations, when a fleet of vehicles 100 are employed to carry multiple portable devices 106, a user is able to track the portable devices 106 in the fleet and, thus, locate portable devices that may be of need to technicians. This can save the technician time in locating the device 106.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle system, comprising:

a first communication device configured to communicate using a first wireless communication method;

a plurality of second communication devices configured to communicate using a second wireless communication method and disposed at two or more known locations along a vehicle; and a controller configured to:

define a communication schedule identifying a designated communication session for a portable device to communicate via the second wireless communication method, provide, via the first communication device to the portable device, data indicative of a designated communication session of the communication schedule for the portable device to communicate via the second wireless communication method, and store a location of the portable device in response to detecting the location of the portable device based on a message provided by the plurality of second communication devices at the designated communication session.

2. The vehicle system of claim 1, wherein:

the communication schedule defines the designated communication session for each portable device from among a plurality of portable devices detected by the first communication device, and the plurality of second communication devices are configured to transmit the message at each of the designated communication sessions.

3. The vehicle system of claim 1, wherein the controller is configured to detect the location of the portable device based on a response message from the portable device received by at least one of the plurality of second communication devices and a location of the at least one of the plurality of second communication devices.

4. The vehicle system of claim 1, wherein the controller is configured to provide a notification that includes a previously detected location of the portable device in response to the plurality of second communication devices not receiving a response message from the portable device.

5. The vehicle system of claim 1, wherein the controller is configured to request the portable device to reduce a power level of the portable device in a message transmitted by the first communication device based on a power level of a response message from the portable device received by at least one of the plurality of second communication devices during the designated communication session.

6. The vehicle system of claim 1, wherein the communication schedule is defined based a time division multiplexing type technique.

7. The vehicle system of claim 1, wherein the second wireless communication method is an ultra-wide band type communication protocol, and the controller is configured to detect the location of the portable device using time of flight message exchange between the portable device and at least one second communication device of the plurality of second communication devices.

8. The vehicle system of claim 1, wherein the controller is configured to provide a device location interface indicating the location of the portable device.

9. The vehicle system of claim 1, wherein the controller is configured to provide, via the first communication device, a power status request message to the portable device and display a power status of the portable device in response to receiving a power status response message from the portable device.

10. A method for locating a portable device by a vehicle having a first communication device configured to communicate using a first wireless communication method and a plurality of second communication devices configured to communicate using a second wireless communication method, the method comprising:

defining a communication schedule identifying a designated communication session for the portable device to communicate via the second wireless communication method;

providing, via the first communication device to the portable device, data indicative of a designated communication session of the communication schedule for the portable device to communicate via the second wireless communication method; and storing a location of the portable device in response to detecting the location of the portable device based on a message provided by the plurality of second communication devices at the designated communication session.

11. The method of claim 10, wherein:

the communication schedule defines the designated communication session for each portable device from among a plurality of portable devices detected and paired with the first communication device, and the plurality of second communication devices are configured to transmit the message at each of the designated communication sessions.

12. The method of claim 10, further comprising detecting the location of the portable device based on a response message from the portable device received by at least one of the plurality of second communication devices and a location of the at least one of the plurality of second communication devices.

13. The method of claim 10, further comprising providing a notification that includes a previously detected location of the portable device in response to the plurality of second communication devices not receiving a response message from the portable device.

14. The method of claim 10, further comprising requesting the portable device to reduce a power level of the portable device in a message transmitted by the first communication device based on a power level of a response message from the portable device received by at least one of the plurality of second communication devices during the designated communication session.

15. The method of claim 10, wherein the communication schedule is defined based a time division multiplexing type technique.

16. The method of claim 10, wherein the second wireless communication method is an ultra-wide band type communication protocol, and the location of the portable device is detected using time of flight message exchange between the portable device and at least one second communication device of the plurality of second communication devices.

17. The method of claim 10, further comprises:

providing, via the first communication device, a power status request message to the portable device and displaying a power status of the portable device in response to receiving a power status response message from the portable device.

18. A vehicle system, comprising:

a first communication device configured to communicate using a first wireless communication method;

a plurality of second communication devices configured to communicate using a second wireless communication method and disposed at two or more known locations along a vehicle; and a controller configured to:

define a communication schedule identifying a plurality of designated communication sessions for a plurality of portable devices, wherein each designated communication session indicates when a respective portable device is to communicate via the second wireless communication method, provide, via the first communication device to the portable device, data indicative of the designated communication session to each portable device, transmit, via the plurality of second communication devices, messages at each designated communication session, and store a location of the plurality of portable devices in response to detecting the location of the portable device based on the messages provided by the plurality of second communication devices at the plurality of designated communication sessions.

19. The vehicle system of claim 18, wherein the controller is configured to:

detect the location of a respective portable device in response to receiving a response message from the respective portable device by at least one of the plurality of second communication devices, the location is determined using a location of the at least one of the plurality of second communication devices and at least one of, time of flight or angle of arrival, and detect the location as a last detected location for the respective portable device in response to the plurality of second communication devices not receiving the response message from the respective portable device.

20. The vehicle system of claim 18, wherein the first wireless communication method is a BLUETOOTH-type communication protocol and the second wireless communication method is an ultra-wide band type communication protocol.

* * * * *